(12) United States Patent
Clark

(10) Patent No.: US 6,718,703 B2
(45) Date of Patent: Apr. 13, 2004

(54) ROOFING TILE ASSEMBLY

(75) Inventor: Andrew S. Clark, Donvale (AU)

(73) Assignee: Lukley Holdings Pty Ltd., Donvale (AU)

( * ) Notice: Subject to any disclaimer, the term of this patent is extended or adjusted under 35 U.S.C. 154(b) by 0 days.

(21) Appl. No.: 09/970,322

(22) Filed: Oct. 3, 2001

(65) Prior Publication Data

US 2002/0038530 A1 Apr. 4, 2002

Related U.S. Application Data

(60) Provisional application No. 60/237,443, filed on Oct. 3, 2000.

(30) Foreign Application Priority Data

Nov. 17, 2000 (AU) .............................................. PR1547
May 7, 2001 (AU) .............................................. PR4798

(51) Int. Cl.[7] .............................. E06B 7/00; E04B 1/92
(52) U.S. Cl. ........................ 52/171.3; 52/168; 52/220.2
(58) Field of Search ................................ 52/171.3, 168, 52/173.3, 220.2, 172, 220.3, 220.4, 220.5, 220.6, 220.8

(56) References Cited

U.S. PATENT DOCUMENTS

| 4,148,296 A | * | 4/1979 | Parlato | 126/663 |
|---|---|---|---|---|
| 4,202,319 A | * | 5/1980 | Vinz | 126/634 |
| 4,278,071 A | * | 7/1981 | Brill-Edwards | 126/622 |
| 4,382,435 A | * | 5/1983 | Brill-Edwards | 126/622 |
| 4,404,960 A | * | 9/1983 | Laing | 126/622 |
| 5,022,381 A | * | 6/1991 | Allegro | 126/622 |
| 5,415,155 A | * | 5/1995 | Cohen et al. | 126/663 |
| 5,651,226 A | * | 7/1997 | Archibald | 52/518 |
| 6,044,602 A | * | 4/2000 | Canavan | 52/306 |
| 6,066,372 A | * | 5/2000 | Miles | 428/34 |
| 6,427,394 B1 | * | 8/2002 | Clodic | 52/171.3 |

FOREIGN PATENT DOCUMENTS

| DE | 3820536 | * | 11/1979 |
|---|---|---|---|
| DE | 1980-K9665 C | * | 11/1980 |
| DE | 3014075 A1 | * | 10/1981 |
| FR | 2491978 | * | 4/1982 |
| FR | 2754840 | * | 10/1996 |
| FR | 2784410 | * | 4/2000 |
| GB | 2079342 | * | 1/1982 |

* cited by examiner

Primary Examiner—Jeanette Chapman
(74) Attorney, Agent, or Firm—Volpe and Koenig, P.C.

(57) ABSTRACT

Roofing tiles and associated methods are used in the construction of multi-functional roofs. Tiles are fit together to define an internal cavity which can be sealed to maintain a gas, liquid and/or other material therein. Filling materials include such things as fire retardants, colored materials, heatable liquid or other materials to provide different functional aspects for a roof made from the tiles.

12 Claims, 2 Drawing Sheets

ROOFING TILE ASSEMBLY

FIELD OF INVENTION

This invention relates to a roofing tile structure and assembly. In particular, the present invention relates to an array of improved roofing tiles. It also relates to a method of construction of an array of tiles.

In one form this invention relates to a solar heating system, however it is not limited to such system. In particular, the present invention relates to a heating system assembly, which is made up of an array of roofing tiles; each tile or array capable of operating independently so as to allow efficient heating of liquid passing therethrough.

BACKGROUND OF THE INVENTION

Referring to the applicant's own earlier invention, described in AU 651193, there is disclosed a system of interconnected roof tiles. The roof tiles are each provided with cavities to receive liquid from a reservoir and are connected in turn to adjacent tiles to enable continuous flow of liquid therethrough.

During passage of the liquid through the system of interconnected tiles, heat, generated from incident solar radiation on the surface of each tile, is transferred to raise the temperature of the liquid. The liquid, having flowed through a series of interconnected tiles, is collected and stored in an insulated receiving tank.

The applicant has found that the system of continuous flow through a series or cluster of interconnected tiles is inefficient; primarily due to formation of air locks and friction losses occurring across the series of tiles in the direction of flow. As a result, the volume of liquid flowing through a series of interconnected tiles is significantly lower than is required to operate at optimum efficiency. For example in the applicant's prior art system, liquid flow rate through the series of interconnected tiles was measured at 2 liters/min when in fact 15 liters/min is required to achieve optimum efficiency.

Conventional solar panels of the type which, (a) allow transmission of incident solar radiation; (b) operate in combination with tubing of indeterminate length to enable continuous flow of liquid therethrough; and (c) cause heat transfer to the liquid flowing through the tubing, are well known.

It is known that conventional solar panels of the above construction are heavy, cumbersome, and frequently cause damage to the structural integrity of a conventional roof tile. Constructions of this known type have also been known to cause ceiling damage when leakage occurs through damaged roof tiles.

The above problems associated with conventional panel type constructions have been addressed by the present applicant in his granted Australian Patent No. 651193, however modification of the applicant's own prior art system is required to address previously mentioned problems.

There is also known in the building industry to have a system of interconnected solid roof tiles. The roof tiles are generally made from natural materials such as slate or ceramic or other natural clay or stone material. It is also known to have such roof materials be simulated by solid concrete tiles. However, all of these tile structures are based on strong heavy material providing a sturdy roof barrier to the elements. Such heavy roof tiles require a substantial and sturdy roof support structure.

Another major problem of such roof tiles is that they are adequate for providing the necessary barrier to the elements but do not provide any other benefits. For example it is necessary in usual roofing systems to include an insulation layer beneath the tiles in the roof cavity above the internal ceilings of the building.

Further in case of the need to walk over such tiles for maintenance or replacement or access to roof mounted accessories the tiles can be readily broken by the concentrated weight of a person on one or more tiles.

It is therefore an object of the invention to provide an improved roof tile, which overcomes or ameliorates one or more of the above identified problems.

It is also an object of the invention to provide a much more versatile tile in its use and application.

It is a still further object of the invention to provide a more cost effective roof tile or roofing system.

SUMMARY OF THE INVENTION

In accordance with the invention there is provided a roofing tile having an outer shape able to fit together with a plurality of similarly formed tiles to create an array of tiles that covers a roof and wherein the roofing tile has an internal cavity able to be filled with gas, liquid or material, wherein the roof tile provides at least a roof protecting function of combating the usual natural elements such as hail, rain and sunshine and the like.

The tile can have a sealable closure to the cavity whereby after the tile is filled with liquid or material or is retained empty the closure can be sealed to prevent escape of gas, liquid or material or ingress of unwanted gas, liquid or material.

In one form the gas, liquid or material can be fire retardant material. In another form the material and structure of the tile and the choice of the gas, liquid or material can be selected to provide an optical effect such as a choice of colour of the tile by the choice of colour of the filling gas, liquid or material. In another form the combination of materials, structure and filler provides a transparent or translucent effect to provide a selectable roof "window".

In one embodiment there is a single tile having an internal cavity that can be filled through inlet such that the individually filled tile will be a lightweight product making it easy to transport and install. The required filler can be inserted into the tile when on the ground prior to forming the array or when in position on the roof in an array.

In use of the method of forming a roof for a building, the method includes the steps of providing one or more tiles able to be located relative to each other or other tiles to form an array that forms a roof or the like, at least one tile incorporating a cavity therewithin, an inlet for receiving a gas, liquid or material filler into said cavity and an outlet connecting with an inlet of an adjacent tile; providing said filler to said tile at a location prior to positioning in an array or after being positioned in the array through the inlet feeding to each cavity; and providing a sealable closure for sealing each inlet and cavity to seal the one or more tiles in the array.

In accordance with the invention there is also provided an array of tiles, each tile in said array incorporating a cavity therewithin for the passage of gas, liquid or material filler therethrough, said each tile further incorporating an inlet for receiving said filler and at least one sealable closure for closing said array or part of the array to prevent ingress or egress from the array.

Each tile may further include an outlet, wherein said each tile in said array is interconnected, either directly or via an adjacent tile, via said inlet to an inlet manifold and each tile in said array is correspondingly interconnected, either directly or via an adjacent tile, via said outlet to an outlet manifold such that the filler can received by the array from a single location and the array can be sealed at that single location by said sealable closure. The inlet and outlet manifolds may be structural parts formed by shaped cavities of each tile.

It is one object of the present invention to improve the efficiency of heating liquid. A further object of the present invention is to ameliorate some or all of the disadvantages of the applicants earlier system.

Therefore the present invention, in a first aspect, is directed to a solar heating assembly including an array of tiles, each tile in said array being exposed to incident solar radiation and incorporating a cavity therewithin for the passage of liquid therethrough, said each tile further incorporating an inlet for receiving liquid from a reservoir and an outlet for returning said liquid in said cavity to a main collection vessel, wherein said each tile in said array is interconnected, either directly or via an adjacent tile, via said inlet to an inlet manifold and each tile in said array is correspondingly interconnected, either directly or via an adjacent tile, via said outlet to an outlet manifold.

In a second aspect, the invention is directed to a method of heating liquid by incident solar radiation, said method including a solar heating assembly including an array of tiles, each tile in said array being exposed to incident solar radiation and incorporating a cavity therewithin for the passage of liquid therethrough, said each tile further incorporating an inlet for receiving liquid from a reservoir and an outlet for returning said liquid in said cavity to a main collection vessel, wherein said each tile in said array is interconnected, either directly or via an adjacent tile, via said inlet to an inlet manifold and each tile in said array is correspondingly interconnected, either directly or via an adjacent tile, via said outlet to an outlet manifold, said inlet manifold drawing liquid from said reservoir so as to allow independent passage of liquid into said cavity of said each tile in said array for heating of said liquid prior to said liquid exiting said outlet of each tile into said outlet manifold for collection in said collection vessel.

The applicant has found that the assembly of the invention increases efficiency of water heating in terms of volume throughput. The extent to which the efficiency is increased is very significant and has been measured at about 15 liters/min. The assembly of the present invention overcomes efficiency problems associated with friction loss across a series of tiles and air locks to achieve a working liquid throughout rate of 15 liters/min.

Also according to the invention there is provided a method of forming a roof for a building, said method including: forming an array of tiles, each tile in said array incorporating a cavity therewithin, an inlet for receiving a gas, liquid or material filler into said cavity and a sealable closure for closing said inlet; providing said filler to said array individually to each tile either before or after forming the array; and sealing said closures of each tile either before or after forming the array.

The invention also provides a method of forming a roof for a building, said method including: forming an array of tiles, each tile in said array incorporating a cavity therewithin, an inlet for receiving a gas, liquid or material filler into said cavity and an outlet connecting with an inlet of an adjacent tile; providing said filler to said array from a single location to each tile in the array through the passage formed by the plurality of cavities and interconnecting inlets and outlets; and providing a sealable closure for sealing the array at the single location to seal the array.

Each tile in said array can be in one form interconnected, either directly or via an adjacent tile, via said inlet to an inlet manifold and each tile in said array is correspondingly interconnected, either directly or via an adjacent tile, via said outlet to an outlet manifold, said inlet manifold drawing filler from said single location so as to allow independent passage of filler into said cavity of said each tile in said array. The inlet and outlet manifold can be structurally included in each of said structures of each tile cavity.

As can be seen the assembly of the invention increases efficiency of roof construction and increases the usefulness of each tile by allowing to be filled with fire retardant material, which provides added protection to the building. Also construction of roofs can bed greatly increased since the tiles could be fairly light until they are filled with the filler.

The assembly further includes an inlet main from which a series of inlet manifolds extend to engage said each inlet port of said each tile in the array.

The assembly further includes an outlet main return from which a series of outlet manifolds extend to engage said each outlet port of said each tile in the array.

An array of tiles can be at least one row of tiles; and/or at least one column; or a cluster of tiles.

The ratio of inlet manifolds to outlet manifolds associated with a given array of tiles is substantially 1:1. Throughout the specification a ratio of 1:1 is understood to mean that for a given discrete array of tiles, adjacent tiles may be interconnected so that filler can flow across a threshold number of tiles before friction and flow losses are encountered and/or reach a critical level.

Each tile in an array incorporates at least one internal rib within the cavity so as to divide the cavity into two interconnected spaces to improve flow characteristics.

The inlet main is connected to the single location and a pumping device, to enable liquid to be drawn through the inlet manifolds and into tiles interconnected thereto. Preferably, the solar heating assembly further includes an inlet main from which a series of inlet manifolds extend to engage said each inlet port of said each tile in the array.

Preferably, the solar heating assembly further includes an outlet main return from which a series of outlet manifolds extend to engage said each outlet port of said each tile in the array.

Preferably, an array of tiles can be at least one row of tiles; and/or at least one column; or a cluster of tiles.

Preferably, the ratio of inlet manifolds to outlet manifolds associated with a given array of tiles is 1:1. Throughout the specification a ratio of 1:1 is understood to mean that for a given discrete array of tiles, adjacent tiles may be interconnected so that liquid can flow across a threshold number of tiles before friction and flow losses are encountered and/or reach a critical level.

Preferably, each tile in an array incorporates at least one internal rib within the cavity to divide the cavity into two interconnected spaces to improve flow characteristics.

Preferably, the inlet main is connected to the reservoir and a pumping device, to enable liquid to be drawn through the inlet manifolds and into tiles interconnected thereto.

Preferably, the main outlet return is connected to an insulated collecting vessel.

Preferably, the array of tiles includes a sheet of black polyethylene disposed beneath their surface.

BRIEF DESCRIPTION OF THE DRAWINGS

In order that the invention is more readily understood embodiments will be described by way of illustration only with reference to the drawings wherein.

DETAILED DESCRIPTION OF THE PREFERRED EMBODIMENT

Figure 1:
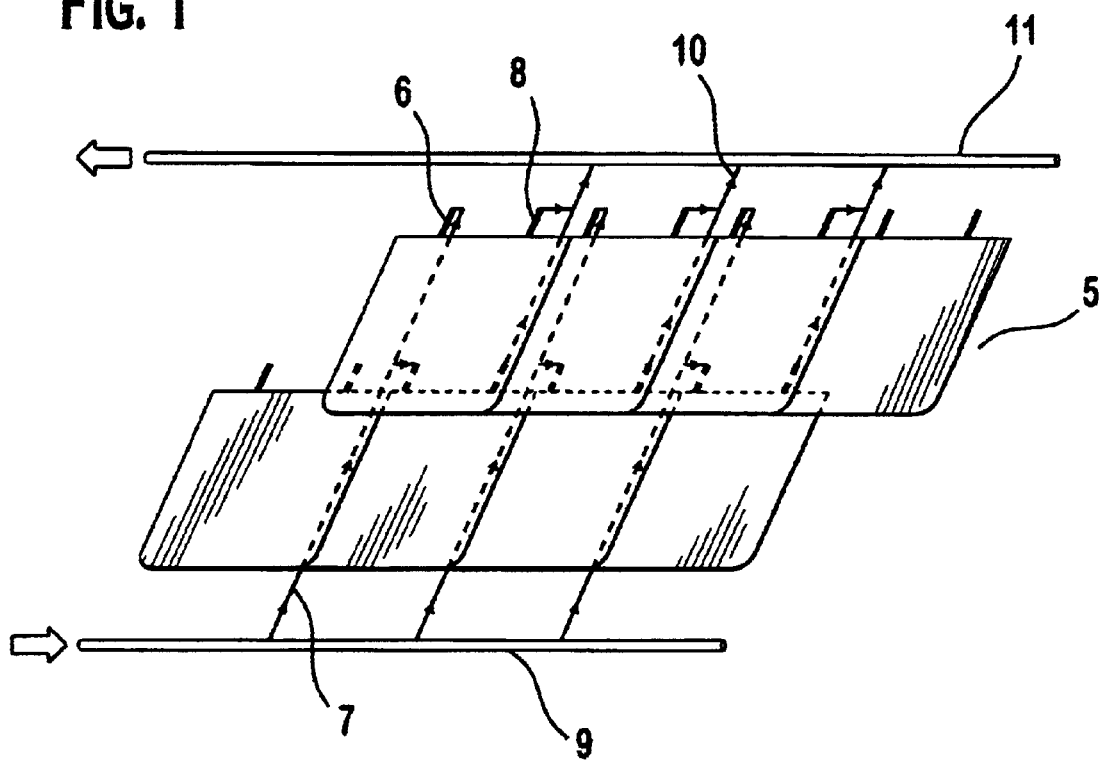
FIG. 1: is a schematic plan view of an array of tiles incorporating one embodiment of the assembly of the invention.

Referring to the drawings, in FIG. 1 there is illustrated an array of tiles (5) according to the invention. The particular array illustrated in FIG. 1 shows two rows of tiles offset and in slightly overlapping relation. Each of the tiles in the array has an inlet nipple (6), allowing for liquid flow from an inlet manifold (7) into a cavity within each tile, and an outlet nipple (8).

As illustrated in FIG. 1 there is represented a series of inlet manifolds (7) emerging at regular spaced intervals from a major liquid line (9). Each inlet manifold is connected at its distal end (relative to the major liquid line (9)) to corresponding inlet nipple(s) (6). In FIG. 1 each single tile in the array of tiles (5) has its inlet nipple connected to an inlet manifold. Similarly and correspondingly each outlet nipple (8) on each tile in the array is connected by an outlet manifold (10) to a major collection line (11). Therefore in this embodiment the ratio of the number of inlet manifolds per row of tiles in the array to the number of outlet manifolds per row is 1:1. It is understood that connection between inlet and outlet nipples and respective manifolds is carried out in conventional ways such as by way of clamping arrangements so as to prevent leakage.

Figure 4:
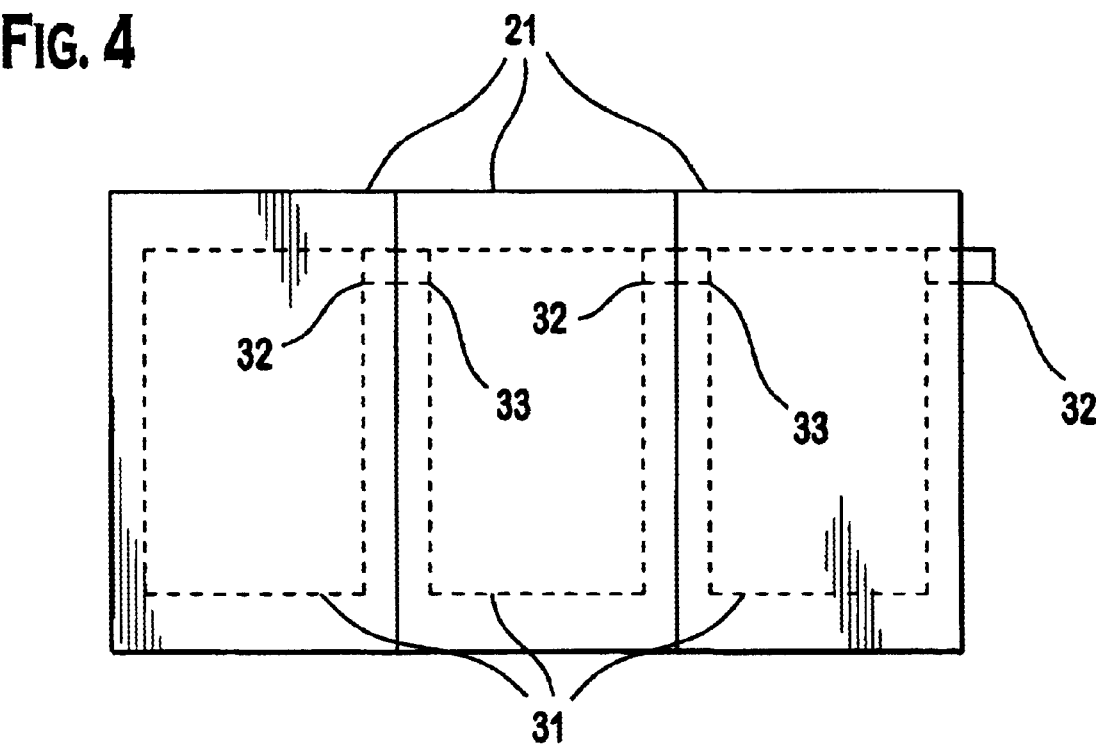
FIG. 4: is a schematic plan view of an array of tiles incorporating a still further embodiment of the assembly of the invention.

In an alternate embodiment shown in FIG. 4 each tile in a row of tiles (21) may be interconnected with an adjacent tile. In this embodiment there may be one inlet manifold (32) connected to a first tile (21) while the outlet nipple (33) of the same tile (21) may be connected to the inlet nipple (32) of its adjacent overlapping tile. Further adjacent tiles (21) may be interconnected in similar fashion so long as (a) a terminal tile has its outlet nipple coupled to an outlet manifold which in turn is interconnected to the major return line and (b) the number of tiles interconnected does not exceed a threshold number which will cause function loss, air locks and inefficient feeding of filler.

As illustrated in FIG. 1 the assembly shows flow of filler from a single location by conventional pumping means through a horizontal oriented major flow line (9). The inlet manifold lines (7) extend from the major flow line in a direction substantially transverse to the major flow line and are connected to an inlet nipple shown integrally formed with a tile in the array. Filler thus flows from the inlet manifold into a cavity (not shown) within a tile via the inlet nipple. The cavity within the tile may include several conventional ribbed longitudinal portions, which effectively divide the cavity into a number of compartments so as to encourage flow of filler in one direction. Filler therefore ordinarily flows in a counterclockwise direction exiting the outlet nipple (8). In FIG. 1 the outlet manifold is integrally connected its end furthest from the outlet nipple to a return line (11). The return line (11) may be connected to a storage vessel such as a collection tank which may in turn require suitable insulation.

In FIG. 1, while we have described the flow of filler in respect of a single tile in the array, it is understood that because there are multiple inlet manifold lines extending from the major flow line, the process of filler flow and takes place simultaneously and independently across each tile in the array shown.

In use of the method of forming a roof for a building, the method includes the steps of:

i. forming an array of tiles, each tile in said array incorporating a cavity therewithin, an inlet for receiving a gas, liquid or material filler into said cavity and an outlet connecting with an inlet of an adjacent tile;

ii. providing said filler to said array from a single location to each tile in the array through the passage formed by the plurality of cavities and interconnecting inlets and outlets; and iii. providing a sealable closure for sealing the array at the single location to seal the array.

Figure 3:
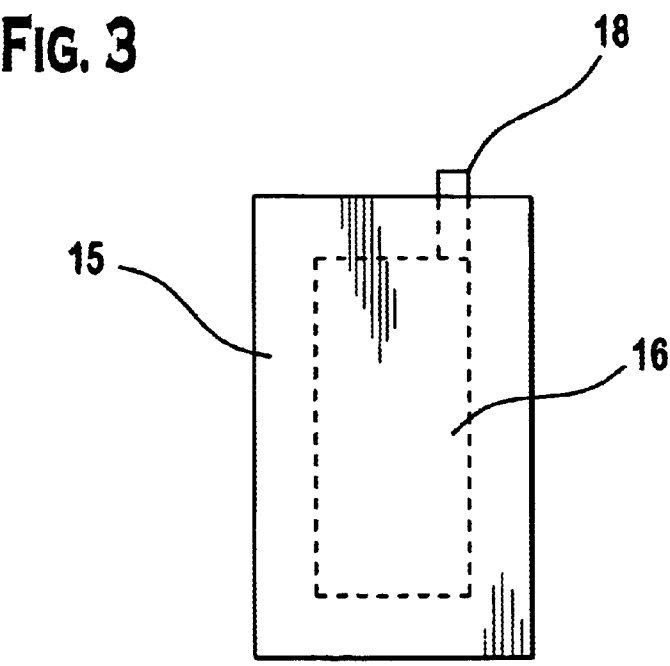
FIG. 3: is a schematic plan view of a tile incorporating a further embodiment of the assembly of the invention.

However in another embodiment as shown in FIG. 3 there is shown a single tile (15) having an internal cavity (16) that can be filled through inlet (18).

In use of the method of forming a roof for a building, the method includes the steps of:

i. providing one or more tiles able to be located relative to each other or other tiles to form an array that forms a roof or the like, at least one tile incorporating a cavity therewithin, an inlet for receiving a gas, liquid or material filler into said cavity and an outlet connecting with an inlet of an adjacent tile;

ii. providing said filler to said tile at a location prior to positioning in an array or after being positioned in the array through the inlet feeding to each cavity; and iii. providing a sealable closure for sealing each inlet and cavity to seal the one or more tiles in the array.

It can be seen that the individually filled tile will be a lightweight product making it easy to transport and install. The required filler can be inserted into the tile when on the ground prior to forming the array or when in position on the roof in an array.

Figure 2:
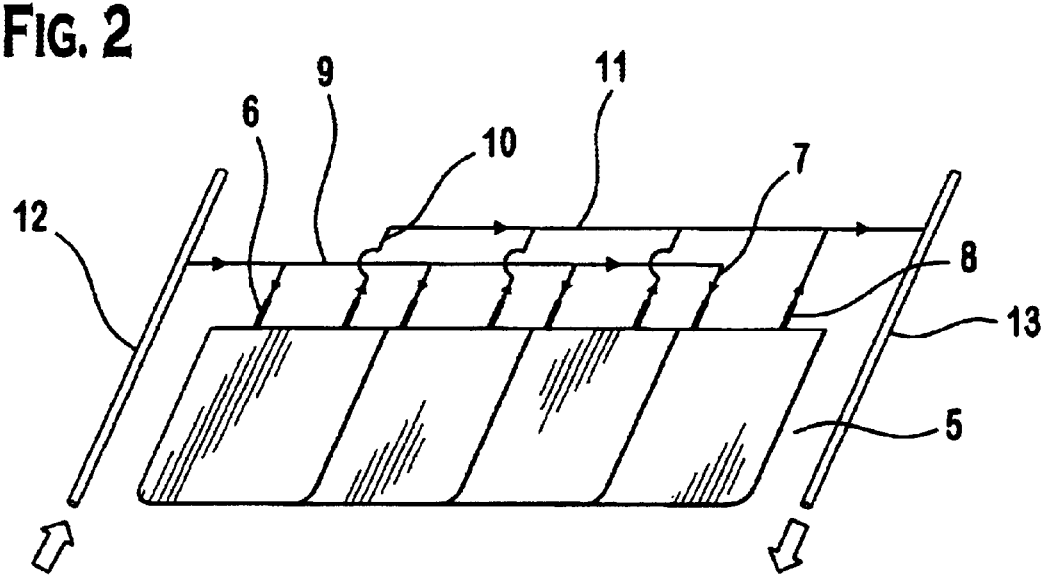
FIG. 2: is a schematic plan view of an array of tiles incorporating the assembly of the invention in a different configuration.

Turning to FIG. 2 there is shown a less complex construction of a single horizontal array of tiles each having an inlet nipple (6) and outlet nipple (8), the arrows indicating direction of filler flow. The array according to FIG. 2 illustrates a configuration having substantially parallel and horizontal spaced inlet (9) and outlet (11) mains from which a series of inlet (7) and outlet (10) manifolds extend in a vertical direction to be connected to respective inlet (6) and outlet (8) nipples.

It is understood in the particular orientation illustrates in FIG. 2 that additional lines (12, 13) are required in substantially vertical orientation to provide (a) a connection for continual filler flow to the inlet main from a source vessel.

Each of the major flow line, return line and inlet/outlet manifold lines can be of conventional construction such as plastic tubing or metallic tubing; and for the sake of retaining a weight of tiles less than heavy slate or concrete tiles the filler gas, filler or material is of a density about the density of water or less.

Referring to FIG. 1 there is illustrated an array of tiles (5) according to the invention. The particular array illustrated in FIG. 1 shows two rows of tiles offset and in slightly overlapping relation. Each of the tiles in the array has an inlet nipple (6), allowing for liquid flow from an inlet manifold (7) into a cavity within each tile, and an outlet nipple (8).

As illustrated in FIG. 1 there is represented a series of inlet manifolds (7) emanating at regular spaced intervals from a major liquid line (9). Each inlet manifold is connected at its distal end (relative to the major liquid line (9)) to corresponding inlet nipple(s) (6). In FIG. 1, each single tile in the array of tiles (5) has its inlet nipple connected to an inlet manifold. Similarly and correspondingly, each outlet nipple (8) on each tile in the array is connected by an outlet manifold (10) to a major collection line (11). Therefore, in this embodiment the ratio of the number of inlet manifolds per row of tiles in the array to the number of outlet manifolds per row is 1:1. It is understood that connection between inlet and outlet nipples and respective manifolds is carried out in conventional ways such as by way of clamping arrangements to prevent leakage.

In an alternate embodiment (not shown), each tile in a row of tiles may be interconnected with an adjacent tile. In this embodiment there may be one inlet manifold connected to a first tile while the outlet nipple of the same tile may be connected to the inlet nipple of its adjacent overlapping tile. Further adjacent tiles may be interconnected in similar fashion so long as (a) a terminal tile has its outlet nipple coupled to an outlet manifold which in turn is interconnected to the major return line and (b) the number of tiles interconnected does not exceed a threshold number which will cause function loss, air locks and inefficient heating of liquid.

As illustrated in FIG. 1 the assembly shows flow of liquid from a reservoir by conventional pumping means through a horizontal oriented major flow line (9). The inlet manifold lines (7) extend from the major flow line in a direction substantially transverse to the major flow line and are connected to an inlet nipple shown integrally formed with a tile in the array. Liquid thus flows from the inlet manifold into a cavity (not shown) within a tile via the inlet nipple. The cavity within the tile may include several conventional ribbed longitudinal portions, which effectively divide the cavity into a number of compartments to encourage flow of liquid in one direction. Liquid therefore ordinarily flows in a counter clockwise direction exiting the outlet nipple (8). In FIG. 1 the outlet manifold is integrally connected its end furthest from the outlet nipple to a return line (11). The return line (11) may be connected to a storage vessel such as a collection tank, which may in turn require suitable insulation.

Each of the major flow line, return line and inlet/outlet manifold lines can be of conventional construction such as plastic tubing or metallic tubing; and for the sake of retaining incident solar radiation it is often desirable to place a sheet of black plastic beneath the entire array of tiles.

It can be seen that the tile can be used individually to form a constructional item that is filled before or when in position. It can be further filled by use of inlet manifold. Closing of each individual tile or the manifold can make the finished product. Further, a flow system can be used to have inflow and outflow into the tiles or array of tiles.

In this latter regard the applicant has found that this new solar heating assembly is very efficient both in terms of cost and liquid throughput. In normal operation of the assembly of the invention, incident solar radiation impinges upon surfaces of each tile in an array. Liquid, directed in the manner shown in FIG. 1, enters the cavity of a tile whereupon heat transfer takes place. The particular advantage bestowed by the instant invention enables efficient heating of an optimum flow rate of liquid.

The above description is of a preferred embodiment. Of course people skilled in the art will understand the invention and without any inventiveness consider variations and these variations are included within the scope of this invention.

What is claimed is:

1. A roofing tile having an outer shape formed from lightweight plastic material and able to fit together with a plurality of similarly formed tiles to create an array of tiles that covers a roof; the roofing tile having an internal chamber extending greater than half of the volume of the tile and able to be filled with gas, liquid or material; and the tile having at least two openings forming an inlet into the chamber able to connect with a source of said filling of gas, liquid or material or adjacent tile and an outlet from the chamber able to connect with an adjacent tile, with said inlet and outlet located at the same end of the tile wherein the roof tile in said array of roof tiles provides at least a roof protecting function of combating the usual natural elements such as hail, rain and sunshine and the like.

2. A roofing tile according to claim 1 with the tile having a sealable closure to the chamber whereby after the tile is filled with liquid or material or is retained empty the closure can be sealed to prevent escape of gas, liquid or material or ingress of unwanted gas, liquid or material.

3. A roofing tile according to claim 1 with the gas, liquid, or material being fire retardant material.

4. A roofing tile according to claim 1 with the form of the material and structure of the tile and the choice of the gas, liquid or material can be selected to provide an optical effect such as a choice of colour of the tile by the choice of colour of the filling gas, liquid or material.

5. A roofing tile according to claim 1 with the combination of materials, structure and filler provides a transparent or translucent effect to provide a selectable roof "window".

6. A roofing tile according to claim 1 having an internal chamber that can be filled through inlet such that the individually filled tile will be a lightweight product making it easy to transport and install.

7. A roofing tile according to claim 1 with the required filler able to be inserted into the tile when on the ground prior to forming the array or when in position on the roof in an array.

8. A roofing tile according to claim 1 with the inlet and outlet located at opposing sides of one end of the tile.

9. A roofing tile according to claim 1 with the inlet and outlet spaced from a top edge to form a pocket above the inlet and outlet allowing for expansion of liquid in the tile.

10. An array of roofing tiles, each roofing tile in said array having an outer share formed from lightweight plastic material and able to fit together with a plurality of similarly formed tiles to create an array of tiles that covers a roof: each of the roofing tiles having an internal chamber extending greater than half of the volume of the tile and able to be filled with gas, liquid or material: each tile having at least two openings forming an inlet into the chamber able to connect with a source of said filling of gas, liquid or material or adjacent tile and an outlet able to connect with an adjacent tile, with said inlet and outlet located at the same end of the tile; and the plurality of chambers in said tiles interconnecting therewithin for the passage of gas, liquid or material filler therethrough, said array of roofing tiles further incorporating an inlet for receiving said filler and at least one sealable closure for closing said array or part of the array to prevent ingress or egress from the array.

11. An array of tiles according to claim 9, with the inlet and outlet being structural parts formed by shaped cavities of each tile.

12. A solar heating assembly including an array of tiles according to claim 9, each tile in said array being able to be exposed to incident solar radiation and incorporating an interconnected chamber therewithin for the passage of liquid therethrough, said solar heating assembly further incorporating an inlet for receiving liquid from a reservoir and an outlet for returning said liquid in said interconnected chamber to a main collection vessel.

* * * * *